United States Patent [19]
Dion

[11] Patent Number: 5,276,828
[45] Date of Patent: Jan. 4, 1994

[54] METHODS OF MAINTAINING CACHE COHERENCE AND PROCESSOR SYNCHRONIZATION IN A MULTIPROCESSOR SYSTEM USING SEND AND RECEIVE INSTRUCTIONS

[75] Inventor: Jeremy Dion, Santa Clara County, Calif.

[73] Assignee: Digital Equipment Corporation, Maynard, Mass.

[21] Appl. No.: 317,538

[22] Filed: Mar. 1, 1989

[51] Int. Cl.[5] .................. G06F 12/12; G06F 15/16
[52] U.S. Cl. ............................ 395/425; 395/200; 395/650; 364/DIG. 1; 364/228.1; 364/228.3; 364/229.2; 364/230.3; 364/230.4; 364/240.1; 364/243.44; 364/246.1; 364/259.2; 364/270.7
[58] Field of Search ............ 364/DIG.; 395/650, 700, 395/200, 425

[56] References Cited

U.S. PATENT DOCUMENTS

| | | | |
|---|---|---|---|
| 3,810,114 | 5/1974 | Yamada et al. | 395/325 |
| 3,813,651 | 5/1974 | Yamada | 395/325 |
| 4,866,664 | 9/1989 | Burkhardt, Jr. et al. | 395/200 |
| 4,965,717 | 10/1990 | Cutts, Jr. et al. | 395/425 |
| 4,984,153 | 1/1991 | Kregness et al. | 395/425 |
| 4,989,131 | 1/1991 | Stone | 395/375 |
| 5,025,365 | 6/1991 | Mathur et al. | 395/600 |
| 5,041,971 | 8/1991 | Carvey et al. | 395/800 |
| 5,045,996 | 9/1991 | Barth et al. | 395/425 |

Primary Examiner—Thomas C. Lee
Assistant Examiner—Matthew C. Fagan
Attorney, Agent, or Firm—Flehr, Hohbach, Test, Albritton & Herbert

[57] ABSTRACT

For use with a multiprocessor system employing shared memory, a software controlled method maintains cache coherency and execution synchronization among processors. A processor executing a SEND instruction transfers a cache line to one or more processors executing a RECEIVE instruction in a synchronized manner. The processors also execute the SEND and RECEIVE instructions to synchronize the execution of iterations of a program loop whereby a control processor distributes indices of the iterations to be performed by each worker processor.

9 Claims, 8 Drawing Sheets

Fig. 3 FLUSH

Fig. 4 CLEAR

Shared Bus Signals Required for Synchronization

Fig. 8A

Processor connection to send, receive and match signal

CONTROL PROCESSOR LOOP

Fig. 11A

SLAVE PROCESSOR LOOP

Fig. 11B

METHODS OF MAINTAINING CACHE COHERENCE AND PROCESSOR SYNCHRONIZATION IN A MULTIPROCESSOR SYSTEM USING SEND AND RECEIVE INSTRUCTIONS

FIELD OF THE INVENTION

This invention is directed generally to a shared memory multiprocessor system, each multiprocessor having a private cache, and more particularly to a software method for maintaining cache coherence.

BACKGROUND OF THE INVENTION

Shared memory multiprocessors often use a cache with each processor to reduce memory latency, and to avoid contention on the network between the processors and main memory. In such a system, there must be some mechanism provided to allow programs running in different processors to have a consistent view of the state of the shared memory, even though they may all write to the same location simultaneously. That is, it is necessary to ensure that two processors reading the same address from their caches will see the same value. Most schemes for maintaining this consistency, known as cache coherency, use snoopy caches, directories, or software techniques.

Snoopy cache methods are the most commonly used. In snoopy cache systems, each cache must observe all read and write traffic on the bus which interconnects the processors. A snoopy cache controller listens to transactions between main memory and the other caches, and updates its state based on what it hears. The nature of the update varies from one snoopy cache scheme to another. For example, on hearing that some caches modified the value of a block, the other caches could either invalidate or update their own copy. Because all caches in the system must observe the memory transactions, a shared bus is the typical medium of communication.

Because the caches must also satisfy read requests from other processors for which they have the most recent value, the cache memory must be dual ported. Reads and writes must be permitted both from the processor side of the cache and from the shared bus side. For high performance systems in which the reference rate from the processor is high, either the tag store of the cache must be duplicated, or a significant cycle-stealing penalty must be accepted as bus accesses to the cache interfere with processor accesses.

Snoopy caches provide an illusion of truly shared global memory. This makes the method very difficult to expand to more than a few processors connected by a single shared bus. The fundamental limitation is that when a processor writes a shared datum in a snoopy bus scheme, that data must propagate to all caches in the system in a single cycle. If this were not the case, two processors could succeed in writing different values to the same datum simultaneously, violating the requirement of cache coherence.

Another class of techniques associates a directory entry with each block of main memory; the entry records the current location of each memory block. Memory operations query the directory to determine whether cache coherence actions are necessary.

Both snoopy cache and directory schemes involve increased hardware complexity. However, the caches are invisible at the software level which greatly simplifies machine programming.

As an alternative, cache coherence can be enforced in software, trading software complexity for hardware complexity. Software schemes are attractive not only because they require minimal hardware support, but also because they scale beyond the limits imposed by the bus.

SUMMARY OF THE INVENTION

It is an objective of the present invention to provide an improved software scheme for maintaining cache coherence wherein a sender and one or more receivers exchange data in a synchronized way. As a result, the method can be extended to large numbers of processors connected by a medium for other than a single shared bus. For example, the method could be used to connect a processor using a hierarchy of buses.

The present invention comprises a software-controlled cache consistency method whereby processors explicitly control the contents of their caches, and explicitly cause synchronized data transfers to other processors' caches. In contrast to hardware consistency schemes, the present software method adds no extra logic to the cache memory access path of the processors. Thus, there is no time penalty on every memory reference to maintain cache consistency. The method can also be extended to large numbers of processors and complex interconnection schemes.

In the present invention, two related methods for providing cache coherence are disclosed, both implemented in software. The first method, comprises writing data elements back to main memory to maintain synchronization between, for example, independently compiled programs which do not know about each other or are not trying to interact with each other, but which are sharing data which is to be found in main memory. In the second method, the operations in a single program are broken down into a number of primitives, whereby the single program is broken up into a multiple number of processes, the processes having access to commonly-shared data, the coherence being maintained by exchange of data between the separate caches over the shared bus without writing the cache lines back into the main memory.

The first method is implemented in a preferred embodiment by providing a flush instruction to be used with a lock instruction in a multiprocessor shared bus scheme to organize critical sections of data stored in main memory attached to said bus so that all the multiprocessors see consistent values for a datum. The invariant applied in this method is that when the lock of the critical section is held by no processor, the correct value for the datum is held in main memory. When a critical section is to be calculated, the lock is obtained by a processor, and all data needed to compute the new values of the critical section is flushed. The processor completes the computation of the body of the critical section, flushes the new values to restore the values to the main memory to be accessed by other independently compiled programs, and releases the lock associated with the critical section.

In the second process disclosed herein wherein a single program is to be broken down to be more quickly executed by a plurality of multiprocessors, the multiprocessors are synchronized without transferring the datum being shared by the processors back to main memory, but only among themselves. This is achieved by conditioning a receiving processor to receive data, executing a SEND instruction in a sending processor to send a datum from the sending processor to the receiving processor only when the address sent by the sending processor and the address asserted by the receiving processor are matched, and a matched signal is asserted at the sending processor. When the MATCH signal is asserted, the data values from the designated cache line can be sent to the receiving processor and are copied into its cache. In this way, coherence is maintained between sending and receiving processors without holding the shared bus unnecessarily, and without resorting to transfer of the datum back to main memory.

Other features and advantages of preferred embodiments of these methods will become apparent from a study of the following detailed description of the invention given with reference to the following figures.

DETAILED DESCRIPTION OF A PREFERRED EMBODIMENT

Figure 1:
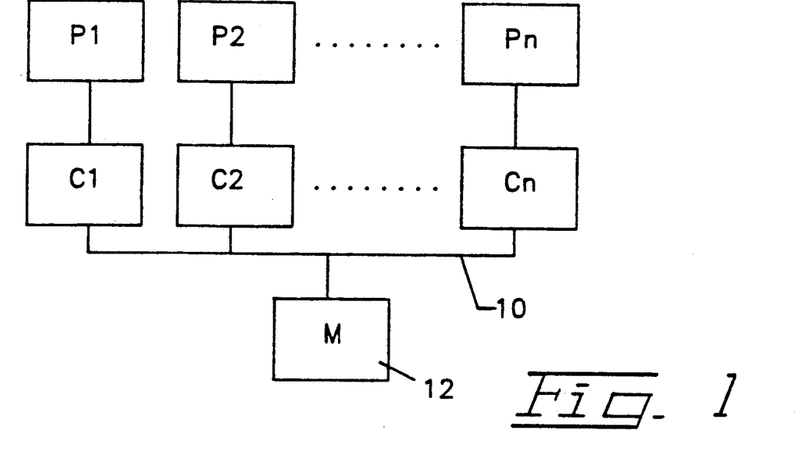
FIG. 1 is a block diagram of a shared memory microprocessor of the type in which the present invention is especially useful.

FIG. 1 is a block diagram of a shared memory multiprocessor system on which the present invention may be implemented. Broadly speaking, the multiprocessor comprises a plurality of processors P1, P2 . . . PN, each with a Private cache memory C1, C2 . . . CN. The cache memories are connected via a shared bus 10 to a common memory or main memory system 12. Each processor P1-PN reads and writes memory by explicit reference to its associated local cache memory C1-CN. If the datum is present in the cache, the access occurs immediately. If the datum is not present, the processor is delayed while cache management hardware retrieves the datum from main memory 12.

In the system under consideration in the present invention, the caches are write-back. This means that when processor Pi stores to a memory location, the datum is modified in cache Ci, and marked as being modified, but is not immediately written to main memory 12. In normal processing, the datum is written back only when the cache location is to be used for a new datum requested by the processor. This means that several different values of the same datum may be present in the different caches. If no special steps are taken, the processors have inconsistent views of the value of the datum, which will cause incorrect program behavior.

Figure 2:
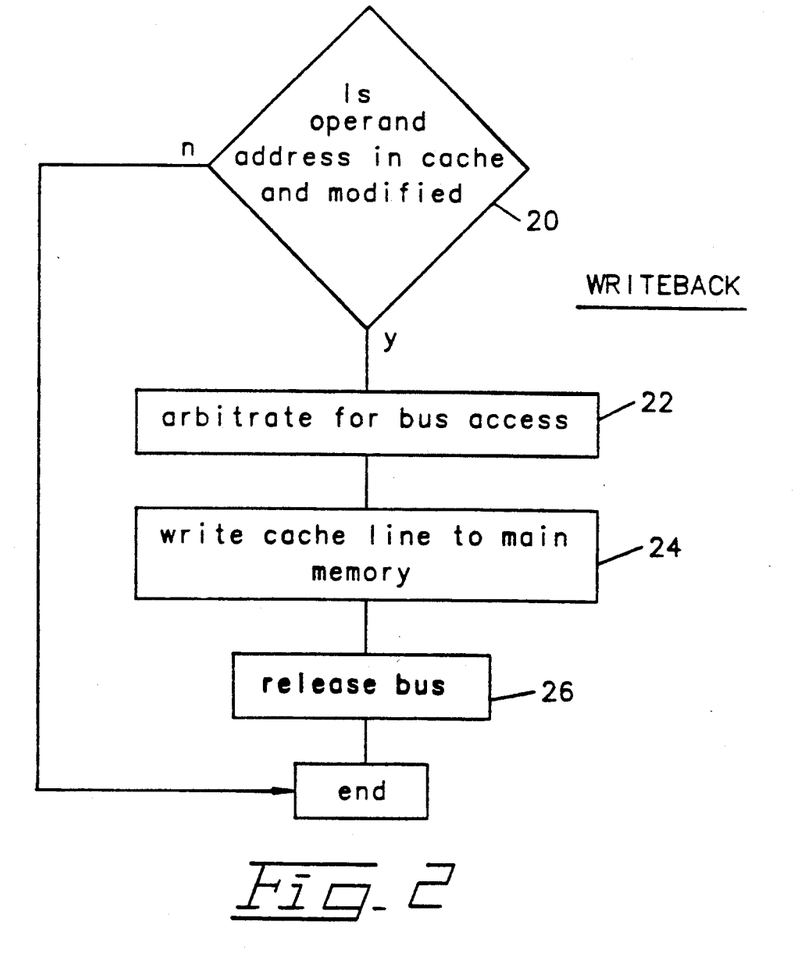
FIG. 2 is a flowchart of the execution of the WRITE-BACK instruction.

In the present invention, explicit software control is provided for the contents of individual caches by the attached processor, and for explicit synchronization and data transfer operations between caches independent of the main memory. The method allows cache coherence to be maintained in a way which does not compromise the performance of single processors accessing unshared data. In the first method to be disclosed especially with reference to FIGS. 2 through 7, a method is disclosed for maintaining cache coherence which is for shared data which are modified by more than one processor P1-PN. Correct program operation may require that the data be written back to main memory 12 according to this method, which may be used, for example, within an operating system. For example, the processors may be running independently compiled programs which while they do not explicitly know about each other trying to interact with each other, they would know that some piece of data was shared. The problem would be that each program does not know what data might be shared at any given time, and therefore maintaining cache coherence becomes an issue. For this purpose, three instructions are provided, of which the first two are especially significant in implementing the software cache coherence method. The write-back instruction disclosed with reference to FIG. 2 tests whether a memory address is present in a cache. If it is not present or is not modified, the instruction has no effect. If the address is present and the datum modified, the cache line containing the address is copied back to main memory and the version in the cache is marked clean. Referring specifically to the steps shown in FIG. 2, the first step 20 comprises a check whether the operand address is in the cache C1–CN of its associated processor P1–PN. This check returns two Boolean values. Valid is true if this address is present in the cache. Dirty is true if this datum is modified in this cache. If not (valid and dirty), the sequence ends. Otherwise, at step 22, the processor arbitrates for access to the shared bus 10; upon obtaining access, the processor writes 24 the cache line containing the datum back to main memory 12; the processor releases 26 access to the shared bus; and the instruction execution is now complete.

Figure 3:
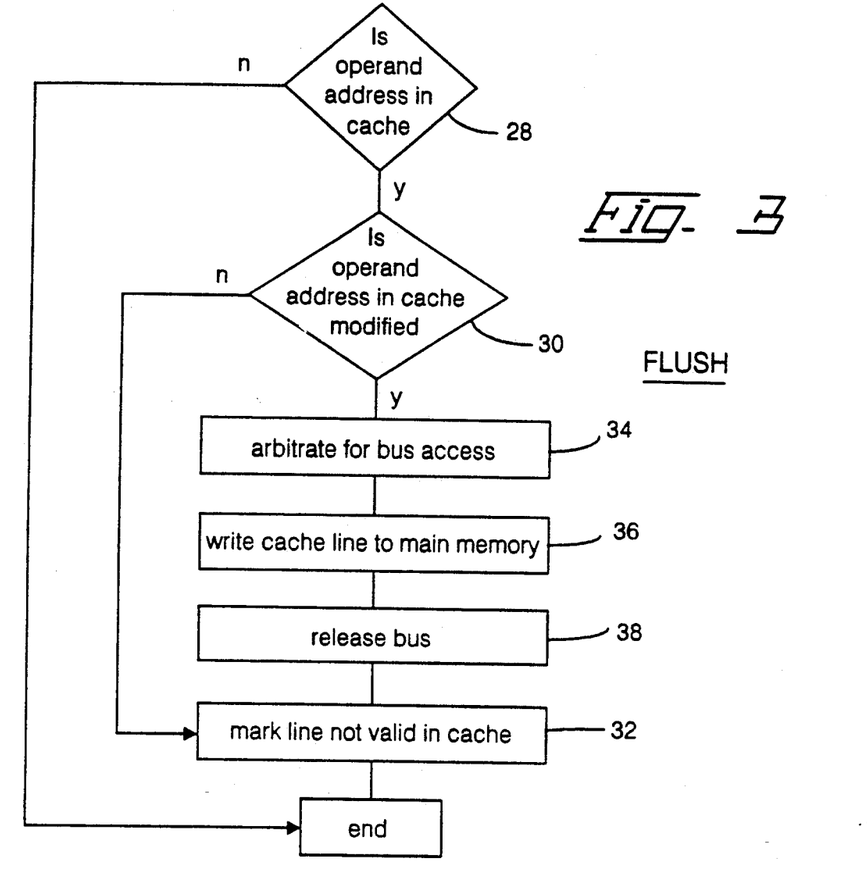
FIG. 3 is a flowchart of the execution of the FLUSH instruction.

The flush instruction disclosed with reference to FIG. 3 also tests whether a memory address is present in the cache. As shown in FIG. 3, element 28, if it is not present, the instruction has no effect. The flush instruction differs from the write-back instruction only in that if a cache line is present in a cache but not modified at the time of execution, the cache line containing the address is marked as not present in the cache.

Thus, referring to the specific sequence shown in FIG. 3, the first step is to check 30 if the address to be flushed is in the cache of the processor. The check returns two Boolean values. Valid is true if this address is present in this cache. Dirty is true if this datum is modified in this cache. If not (valid and dirty), the sequence jumps to step 32 where the line is marked not valid in the cache. Otherwise, the processor P1–PN arbitrates 34 for access to the shared bus; upon gaining access, the cache line is written 36 back to main memory; the shared bus is released 38; and again, the line is marked 32 not valid in this cache. This completes the sequence for this instruction.

Figure 4:
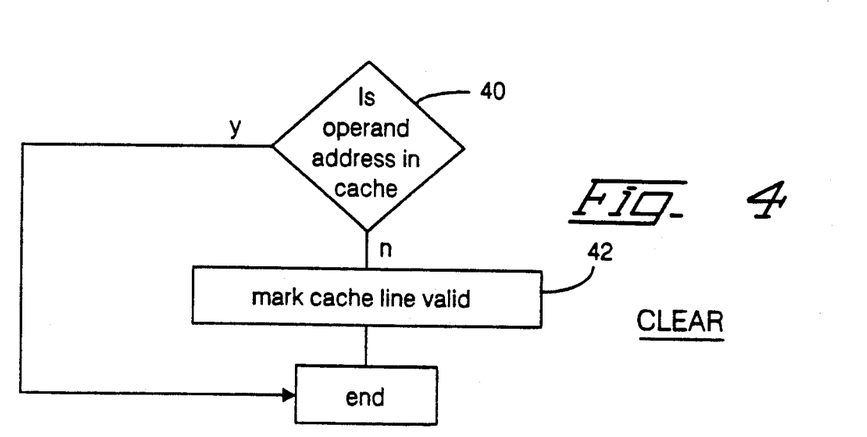
FIG. 4 is a flowchart of the CLEAR instruction.

A third instruction provided for performance optimization is disclosed with reference to FIG. 4. The clear instruction tests whether a memory address is present in the cache. This check 40 returns two Boolean values. Valid is true if the address is present in the cache. Dirty is true if the datum is modified in this cache. If valid is true, the instruction has no effect. If the address is absent, the cache line is mapped 42 into the cache without reading the data from main memory over the shared bus. In this latter case, the data of the cache line are undefined, and may differ from the values in main memory.

Figure 5:
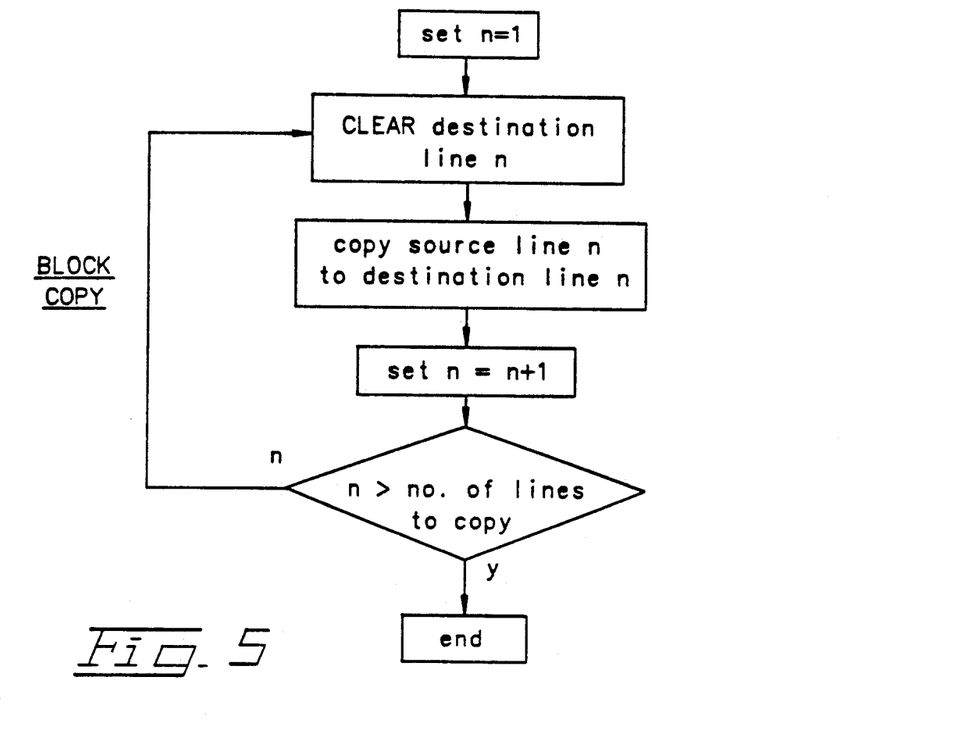
FIG. 5 is a block diagram of a block copy operation.

The instruction may be generated by compilers for code sequences in which the entire contents of a cache line are to be overwritten without being read. For example, when a new stack frame is created on a procedure call, the clear instruction of FIG. 4 could be used to prevent uselessly faulting the old contents of main memory into the cache before these memory locations are completely overwritten. Similarly, in block copy operations, the memory traffic rate can be halved if the contents of the destination are not first faulted into the cache before being completely overwritten. Thus, for example, FIG. 5 illustrates a block copy loop using the clear operation for efficiently copying N lines to a destination. In this example, the destination of the copy is transferred only from the processor's cache to the memory. If both source and destination are not in the cache, this leads to one memory read and one memory write per cache line copied, instead of two memory reads and one memory write without the clear operation.

Figure 6:
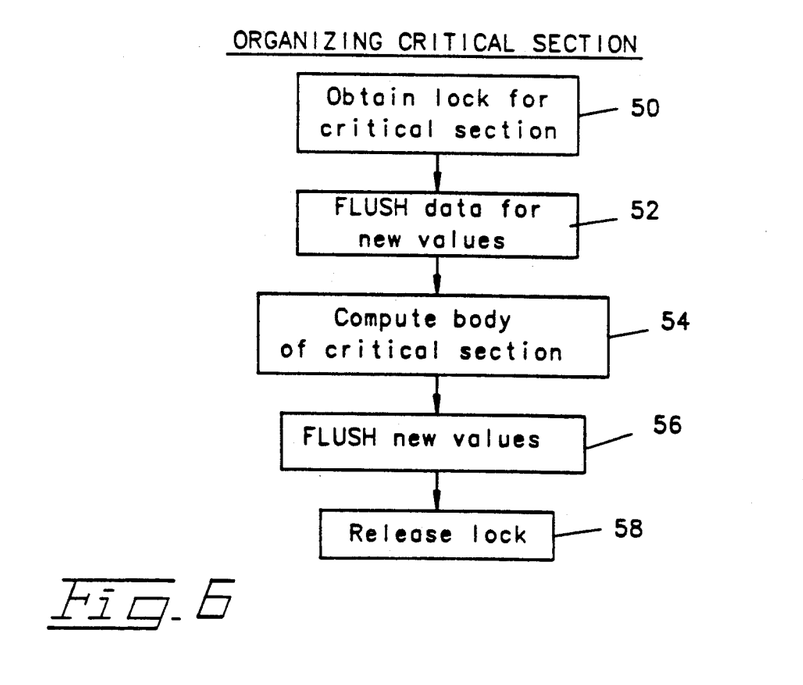
FIG. 6 is a block diagram of a sequence for organizing a critical section using the present invention.

As a further example of the utility of these instructions, the flush instruction may be used with a lock instruction to organize a critical section so that all processors connected to the common bus 10 see consistent values for a datum. The invariant maintained by this convention is that when the lock of the critical section is held by no processor, the correct value for the datum is held in main memory. FIG. 6, which shows the way a critical section can be programmed, begins with one processor P1-PN obtaining a lock 50 for a critical section. The flush instruction is used to flush 52 all data needed to compute new values. The body of the critical section is computed 54, and the new values are flushed 56 to the main memory. On completion of this step, the lock associated with the critical section is released 58.

Figure 7A:
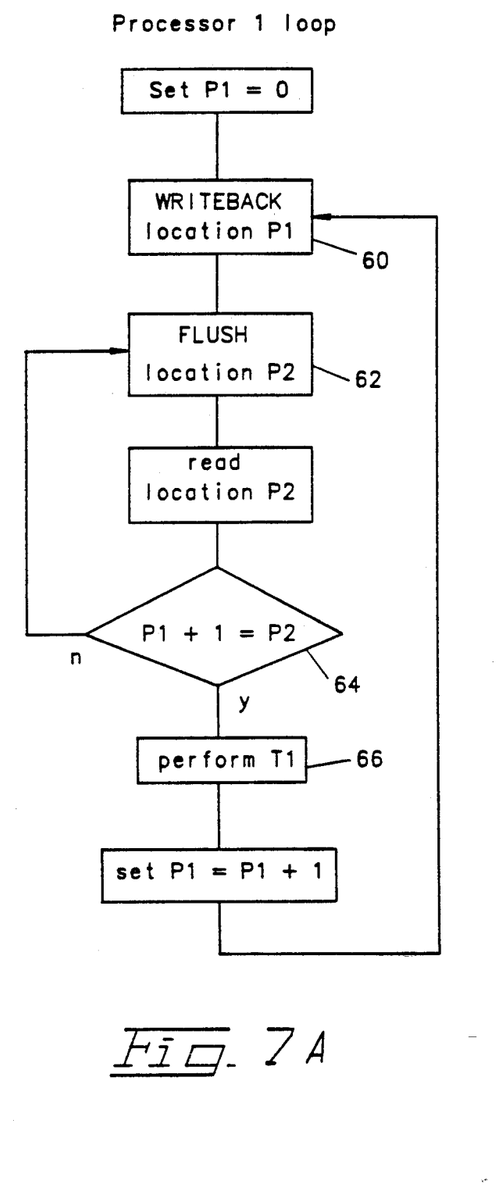
FIGS. 7A and 7B illustrate processor synchronization utilizing the methods of the present invention.
Figure 7B:
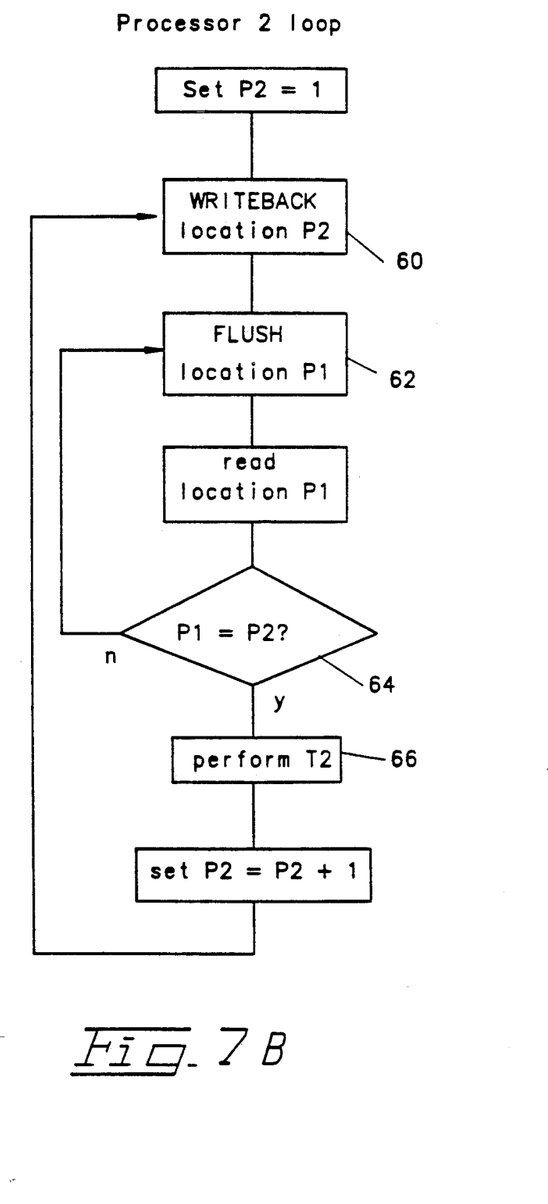

The manner in which two separate processors are kept synchronized using the write-back and flush instructions of this invention is illustrated with respect to FIG. 7. The write-back instruction can be used for greatest efficiency where two processors P1, P2 communicate through main memory 12 by modifying different locations. This is because the data written to main memory need not be removed from the writing processor's cache when it is only modified by that processor. FIGS. 7A and 7B show how two processors can be synchronized to perform tasks T1 and T2 alternately by synchronizing on main memory locations P1 and P2, each of which is modified by only one processor. Note that in each processor loop, after using the write-back and flush instructions 60, 62 to alternate locations, a comparison is performed 64 which allows the processor's task to be performed 66 only if it is established that synchronism has been maintained. On completion of the task, the loop is repeated to again maintain synchronism between the processors.

In a second aspect of the present invention, the problem addressed is that multiprocessor programs also require synchronization between the processors and the ability to communicate data between processors at high speed. To achieve this goal, according to the method to now be described a set and sequence of instructions is described which allows direct transfer of data between processors of a multiprocessor system of the type shown in FIG. 1 with the data transfers being between the individual processors' caches, and without transfer back to the main memory 12 of the system.

To achieve this purpose, a pair of synchronized data transfer instructions is provided. The SEND instruction causes the cache line containing a particular address to be sent to another processor's cache. The RECEIVE instruction causes the cache line containing a particular address to be overwritten by data from another processor. Both of these instructions will be explained in detail below together with their use in organizing a tightly-coupled fine-grained parallel processing problem.

Figure 8A:
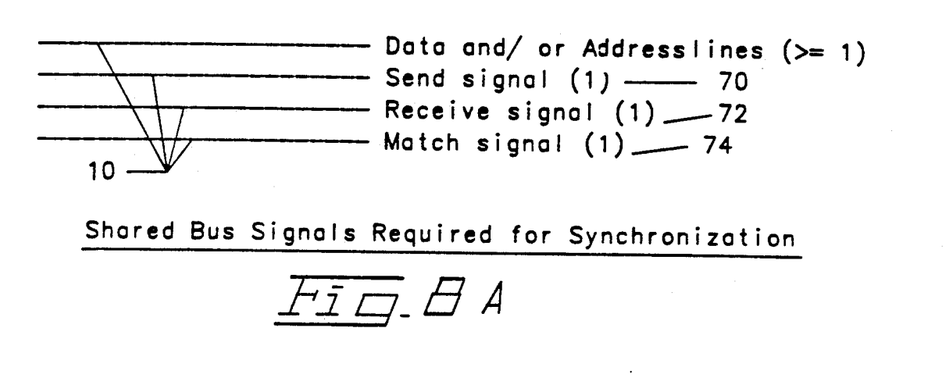
FIG. 8A illustrates the shared bus signals required for synchronization according to the present method.

According to the present invention, the synchronization between sending and receiving processors does not require the shared bus 10 to be held while only one of two processors is ready. For this purpose, three signals are added to the common shared bus as shown in FIG. 8A. These signals can be set and sensed by the cache management hardware attached to the processor. The SEND signal 70 indicates that the value on the shared bus 10 is the address of a cache line to be sent to some other cache. The RECEIVE signal 72 is asserted on the bus 10 for one cycle by any processor P1-PN beginning to execute the RECEIVE instruction. More than one processor may assert "RECEIVE" simultaneously, and the RECEIVE signal is the logical OR of the values requested by all processors. The MATCH signal 74 is asserted by a receiving processor that detects a match with the address transmitted by a sending processor. This signal may also be asserted by multiple processors, and the resulting value is the logical OR of the values requested by all processors.

Figure 8B:
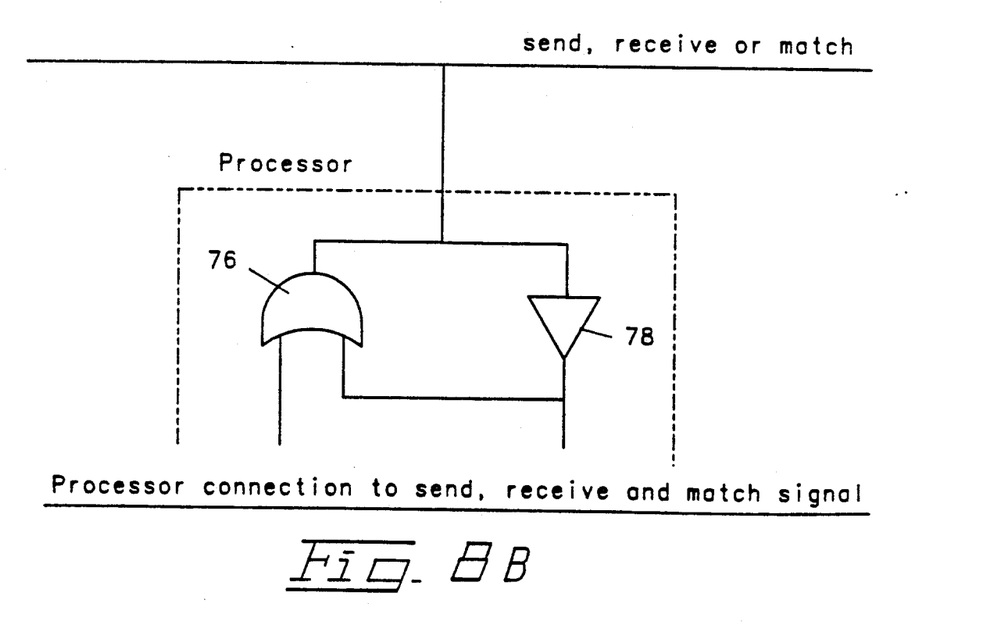
FIG. 8B illustrates the logic necessary to transfer signals according to the present invention.

FIG. 8B shows how the individual processors drive and sense these signals. Connections to all three signals are made in the same way for each processor. The necessary logic is well within the skill of this technology, and comprises simply the addition of an OR gate 76 and a buffer amplifier 78. The signal out of the buffer amplifier are the signals that the processor would sense, and the signal out of the OR gate are those signals that a processor would assert, the wire connecting the buffer amplifier 78 and OR gate 76 being provided so that the output of a given processor can also be seen by that processor.

The SEND instruction which will be explained with reference to FIG. 9 causes the cache line containing a particular address to be sent to another cache. If the cache line is not present in the cache, the processor loads it from main memory in the normal way. Then the sending processor stalls (does not advance its program counter) until some other processor indicates that it is willing to receive the cache line. Then the cache line is transferred to the receiving processor over the shared bus, and marked not present in the sending processor's cache.

Figure 9:
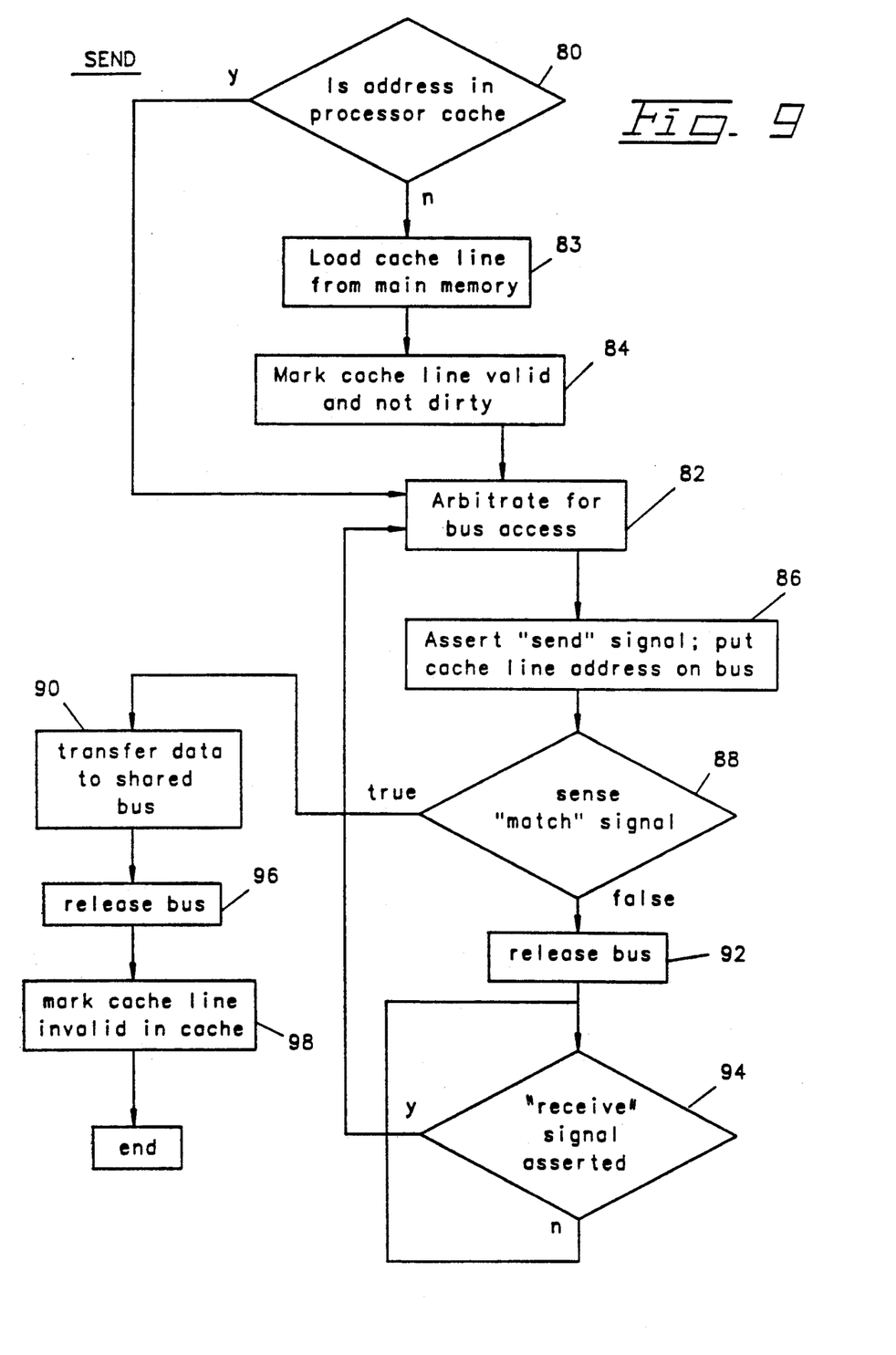
FIG. 9 is a flowchart of the SEND instruction.

Referring specifically now to FIG. 9, the first step is to check 80 if the address to be sent is in the cache of the processor. The check returns two Boolean values. Valid is true if this address is present in this cache. Dirty is true if this data is modified in cache. If the address is present in the cache, go immediately to step 82 and arbitrate for bus access. Otherwise, load 83 is the cache line from main memory; mark 84 the cache line valid and not dirty in the cache, arbitrate 82 for bus access. Next, the SEND signal is asserted 86 and the cache line address is put on the shared data bus. The processor then stalls until a MATCH signal is sensed 88. If the MATCH signal is true, then the data is transferred on the shared bus. If it is not true, the shared bus is released 92 and the processor waits for its assertion of a RECEIVE signal 94. On receipt of the RECEIVE signal, the sequence is repeated beginning from the step of arbitrating for access to the shared bus 82. Upon transfer of the data for the cache line to the shared bus, the bus is released 96 and the cache line is marked not valid in this cache 98.

Figure 10:
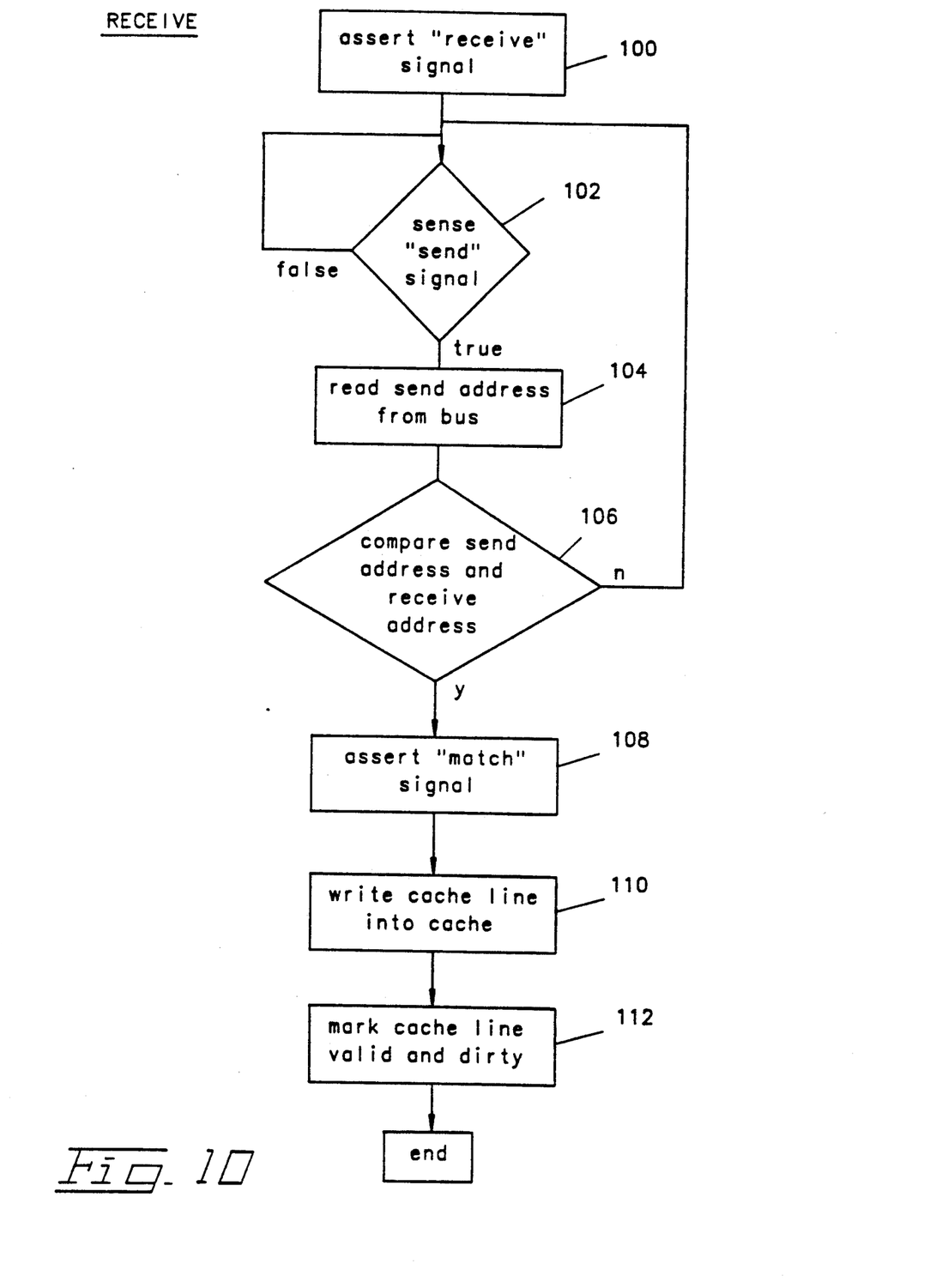
FIG. 10 is a flowchart of the sequence for the RECEIVE instruction.

The RECEIVE instruction causes the cache line containing a particular address to be overwritten by data from another processor. In carrying out this instruction, the RECEIVE signal is first asserted 100 by the processor as shown in FIG. 10. Then the processor stalls indefinitely 102 until some other processor indicates that it is willing to send the cache line, this indicating being detected by sensing of the SEND signal. The receiving processor then reads 104 the SEND address from the shared bus, and checks the SEND address against the local RECEIVE address 106. The MATCH signal is then asserted 108, and the cache line data is copied onto the shared bus and marked present and modified in the receiving cache 110. The receiving processor then marks 112 the cache line valid and dirty in its cache. The synchronization between sending and receiving processes is done only by matching addresses in the SEND and RECEIVE instruction, not by processor numbers or any other means.

The SEND, RECEIVE and MATCH signals are used as follows. When a processor P1-PN begins a SEND instruction, it arbitrates for use of the shared bus. After obtaining exclusive right access to the bus, it puts the address to be sent on the shared bus and simultaneously asserts the SEND signal. The cache management units of all processors suspended in a RECEIVE instruction compare the SEND address with the address they are to receive. The MATCH signal is asserted by each processor in which the comparison succeeds. Receipt of this signal by the sending processor causes it to transmit the data value of the cache line over the shared bus. All matching processors copy the data values into their caches. When all data values have been copied, the sending processor and all the matched receiving processors complete their transfer instructions and advance their program counter.

If no receiving processor asserts the MATCH signal, then each receiving processor remains in the state of waiting for an address match. This does not consume shared bus bandwidth. The sending processor releases control of the shared bus and enters a state in which it waits for the RECEIVE signal to be asserted. Until this happens, the sending processor does not arbitrate for use of the shared bus. The RECEIVE signal will be asserted by the next processor to start a new RECEIVE instruction. When this happens, all the suspended sending processors will arbitrate for the shared bus and rebroadcast their SEND addresses in turn. The SEND and RECEIVE instructions are interruptible. An external event arriving at a processor can cause it to generate an interrupt while it is in the waiting state of either a SEND or a RECEIVE instruction. This makes it possible to interrupt the execution of a collection of synchronized processors in a deterministic way.

Figure 11A:
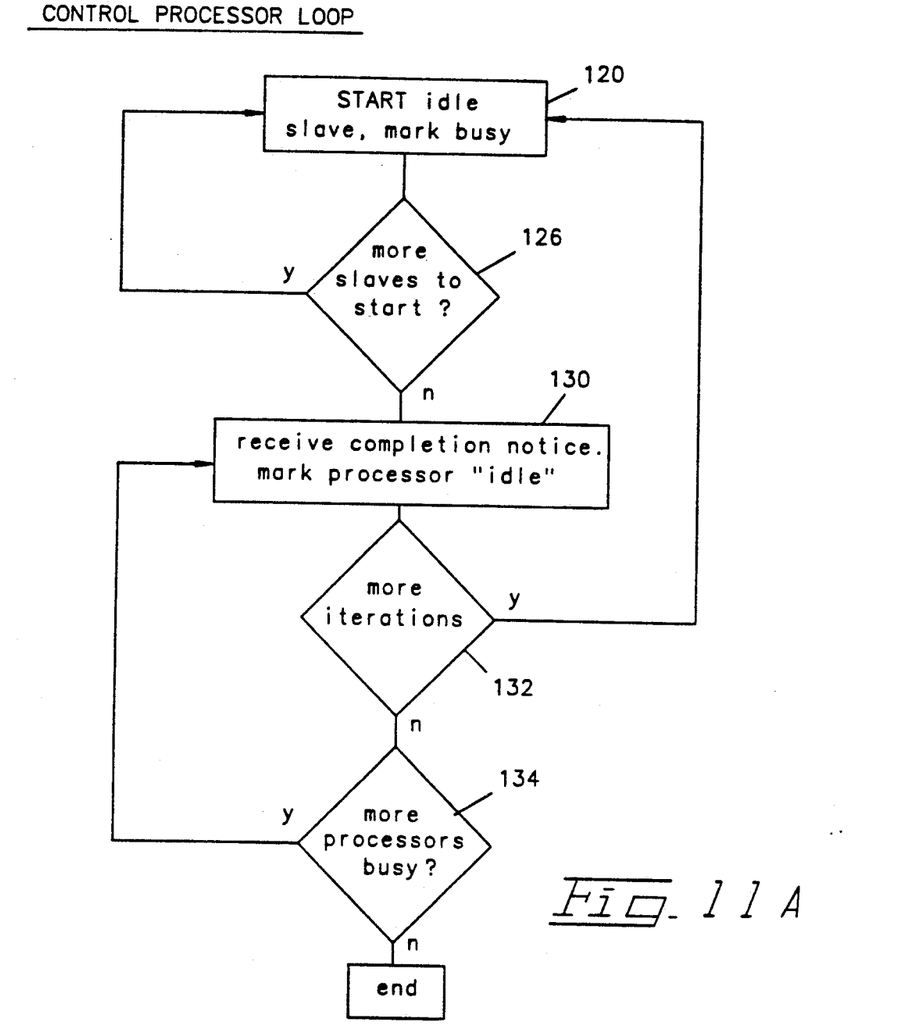
FIGS. 11A and 11B are flowcharts for the control processor loop and slave processor loop used for executing a series of related operations according to the present invention.
Figure 11B:
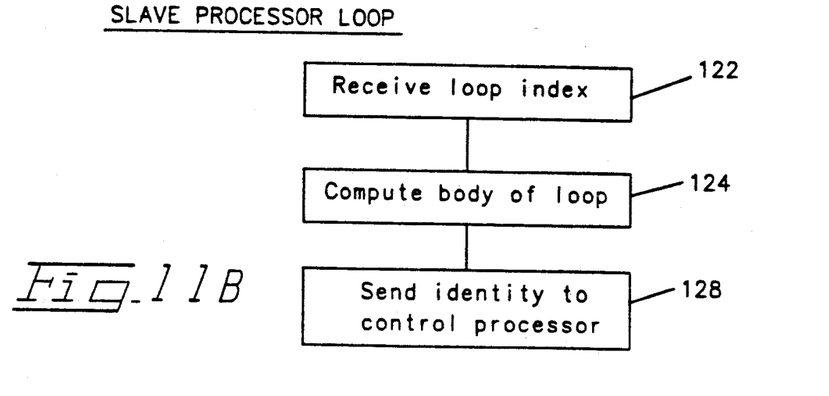

The SEND and RECEIVE primitives may be used to organize tightly-coupled, fine-grained parallel processing in a manner which becomes apparent from the following and FIGS. 11A and 11B. Consider the example of subdividing the work of a program loop by performing iterations in parallel across several processors. One of the processors is nominated as the control processor and follows the loop shown in FIG. 11A. All other processors are worker processors suspended in RECEIVE instructions on different addresses and will follow the loop shown in FIG. 11B. The control processor starts 120 each worker processor by sending it the loop index of the iteration the worker is to perform. The worker processor receives 122 the loop index and calculates 124 the loop body for this index value. If there are data dependencies between loop iterations, these are synchronized with SEND and RECEIVE operations. If a value is needed from some previous loop iteration, the worker executes a RECEIVE instruction on the address of the value. If a value calculated in this iteration is needed by some other processor, the processor executes a SEND on the address of the value. Each slave processor is started in turn 126; as each worker finishes a loop iteration it sends 128 its own identity to the control processor which is receiving 130 completion notices on a single well known address. Because all workers send to the same address at the same control processor, completion notices can be accepted in any order. Upon completion of the iterations by a single processor 132 and the execution of all loops 134 by slave processors, the calculation process is completed.

Modifications of the present invention may occur to a person of skill in the art who studies the present invention disclosure. Therefore, the scope of the present invention is to be limited only by the following claims.

What is claimed is:

1. In a system having a plurality of processors, each processor controlling a respective one of a plurality of cache memories connected via a shared bus to a common memory system, a method for synchronizing execution of one of said processors functioning as a sending processor and execution of a plurality of said processors functioning as receiving processors, the method comprising the steps of:

a) said sending processor executing a SEND instruction specifying a send address, the step of said sending processor executing a SEND instruction comprising the steps of:
      i) awaiting acknowledgement from any of said receiving processors via assertion of a MATCH SIGNAL over said shared bus, and
      ii) thereupon transmitting over said shared bus a cache line corresponding to said send address from the cache memory controlled by said sending processor; and
   b) each receiving processor executing a RECEIVE instruction specifying a receive address, the step of each receiving processor executing a RECEIVE instruction comprising the steps of:
      i) awaiting transmission of said send address by said sending processor over said shared bus,
      ii) thereupon receiving said send address and comparing said send address with said receive address, iii) asserting the MATCH SIGNAL over said shared bus when said send address and said receive address are equal, and iv) thereupon awaiting transmission of the cache line over said shared bus and receiving the cache line into the cache memory controlled by any of the receiving processors which have asserted the MATCH SIGNAL;

whereby execution of said sending processor and said receiving processors is synchronized.

2. The method as claimed in claim 1, wherein the step (b) of each receiving processor executing a RECEIVE instruction further comprises the step of:

each receiving processor asserting a RECEIVE SIGNAL over said shared bus upon executing said RECEIVE instruction to indicate to said sending processor a readiness to receive data over said shared bus.

3. The method as claimed in claim 1, wherein the step (a) of said sending processor executing a SEND instruction further comprises the steps of:

obtaining exclusive write access to said shared bus, and thereafter, transmitting said send address onto said shared bus while simultaneously asserting a SEND SIGNAL over said shared bus to indicate to said receiving processors that said send address has been transmitted onto said shared bus.

4. The method as claimed in claim 1, wherein the step (a)(i) of said sending processor awaiting acknowledgement from any of said receiving processors via assertion of a MATCH SIGNAL over said shared bus comprises the steps of:

1) determining whether any of said receiving processors has asserted the MATCH SIGNAL over said shard bus, 2) if the MATCH SIGNAL has not been asserted by any of said receiving processors, stalling indefinitely until a RECEIVE SIGNAL has been asserted by any of said receiving processors over said shared bus and thereupon retransmitting said send address over said shared bus, and 3) repeating steps (a)(i)(1) and (a)(i)(2) until the MATCH SIGNAL has been detected.

5. The method as claimed in claim 1, wherein the step (b)(i) of each receiving processor awaiting transmission of said send address by said sending processor over said shared bus comprises the steps of:

1) stalling indefinitely until said sending processor has asserted a SEND SIGNAL over said shared bus, and 2) thereupon receiving said send address transmitted by said sending processor;

and further wherein the step (a)(i) of said sending processor awaiting acknowledgement from any of said receiving processors via assertion of a MATCH SIGNAL over said shared bus comprises the steps of:

1) determining whether any of said receiving processors has asserted the MATCH SIGNAL over said shared bus, 2) if the MATCH SIGNAL has not been asserted by any of said receiving processors, stalling indefinitely until a RECEIVE SIGNAL has been asserted by any of said receiving processors over said shared bus and thereupon asserting the SEND SIGNAL and transmitting said send address over said shared bus, and 3) repeating steps (a)(i)(1) and (a)(i)(2) until the MATCH SIGNAL has been detected.

6. The method as claimed in claim 5, further comprising the step of:

interrupting further execution of the RECEIVE instruction by at least one of said receiving processors due to an external event and thereafter resuming execution of the RECEIVE instruction by said at least one interrupted receiving processor; and interrupting further execution of the SEND instruction by the sending processor due to an external event and thereafter resuming execution of the SEND instruction by said sending processor.

7. In a system having a plurality of worker processors and a control processor, each processor having a unique memory address and controlling a respective one of a plurality of cache memories connected via a shared bus, a method of executing a program loop having a plurality of iterations by said plurality of worker processors and said control processor, the method comprising the steps of:

each worker processor executing a RECEIVE instruction causing each worker processor to stall indefinitely until said control processor executes a respective SEND instruction for each worker processor;

said control processor executing a respective SEND instruction for each worker processor to initiate each worker processor to perform a respective one of the iterations of said program loop, the step of executing a respective SEND instruction comprising the steps of:

i) specifying the unique memory address for a respective one of said worker processors, and ii) transferring over said shared bus an index of the iteration to be performed by said one worker processor;

each worker processor receiving the iteration index transferred via execution of its respective SEND instruction and storing the iteration index at its unique memory address;

each worker processor executing the iteration corresponding to its received iteration index in parallel with and asynchronous to execution by the other worker processors;

each worker processor indicating to said control processor completion of its iteration by executing a SEND instruction comprising the steps of:

i) specifying the unique memory address of said control processor, and ii) transferring over said shared bus a unique datum;

said control processor repeatedly executing a RECEIVE instruction specifying the unique memory address of said control processor to receive the unique datum from each worker processor and to store the unique datum at the unique memory address of said control processor, whereby said control processor receives said unique datum from each worker processor in any order;

said control processor initiating each worker processor which has completed its iteration to perform an unexecuted iteration of said program loop by executing a respective SEND instruction comprising the steps of:

i) specifying the unique memory address for a respective one of said worker processors which has completed its iteration, and ii) transferring over said shared bus an index of the unexecuted iteration to be performed by said one worker processor which has completed its iteration; and said control processor ceasing to initiate performance of iterations by said worker processors when all iterations of said program loop have been distributed to said worker processors.

8. The method as claimed in claim 7, wherein execution of an iteration by a first one of said worker processors is dependent on shared datum modified during execution of an iteration by a second one of said worker processors, the method further comprising the steps of:

said first worker processor executing a RECEIVE instruction specifying a memory address of said shared datum, the step of said first worker processor executing a RECEIVE instruction comprising the steps:

i) awaiting execution by said second worker processor of a SEND instruction specifying the memory address, and ii) thereupon receiving the shared datum from said shared bus;

said second worker processor executing a SEND instruction specifying the memory address, the step of said second worker processor executing a SEND instruction comprising the steps:

i) awaiting execution by said first worker processor of a RECEIVE instruction specifying the memory address, and ii) thereupon transmitting said shared datum over said shared bus; and said first and second worker processors each continuing execution independently after execution of said RECEIVE and SEND instructions, respectively.

9. The method as claimed in claim 7, further comprising the steps of:

interrupting further execution of the RECEIVE instruction or the SEND instruction by at least one of said processors due to an external event and thereafter resuming execution of the RECEIVE instruction or the SEND instruction by said at least one interrupted processor.

* * * * *